United States Patent [19]

Maing et al.

[11] 4,263,333

[45] Apr. 21, 1981

[54] CURCUMIN-METAL COLOR COMPLEXES

[75] Inventors: Il Y. Maing, New City; Irene Miller, New York, both of N.Y.

[73] Assignee: General Foods Corporation, White Plains, N.Y.

[21] Appl. No.: 74,620

[22] Filed: Sep. 12, 1979

[51] Int. Cl.$^3$ ................................................ A23L 1/27
[52] U.S. Cl. .................................... 426/540; 426/250; 260/429 J; 260/429.7; 260/429.9
[58] Field of Search ................ 426/250, 540, 74, 262; 260/429 J, 429.9, 448 B, 429.7

[56] References Cited

U.S. PATENT DOCUMENTS

| | | | |
|---|---|---|---|
| 3,162,538 | 12/1964 | Todd et al. | 426/540 |
| 3,336,141 | 8/1967 | Frisina | 426/540 |
| 3,340,250 | 9/1967 | Sair et al. | 426/540 |
| 3,347,682 | 10/1967 | Rosenstein | 426/540 |
| 3,655,406 | 4/1972 | Klaui | 426/540 |
| 4,018,934 | 4/1977 | Parliment | 426/540 |
| 4,138,212 | 2/1979 | Stransky | 426/540 |

OTHER PUBLICATIONS

Chem. Absts., vol. 77, 55962k, 1972, p. 549.
Chem. Absts., vol. 77, 122263y, 1972, p. 37.
Chem. Absts., vol. 78, 143448y, 1973, p. 518.
Cond. Chem. Dict., 9th ed., p. 243.
Dictionary of Organic Compounds, vol., p. 622.

*Primary Examiner*—Jeanette M. Hunter
*Attorney, Agent, or Firm*—Thomas R. Savoie; Daniel J. Donovan

[57] ABSTRACT

A complex, and a process for preparing said complex, formed by the reaction of curcumin, turmeric, with certain metal ions. The metal-curcumin coloring complex is water soluble and capable of producing varying hues of the same colors for use in foodstuffs.

12 Claims, No Drawings

4,263,333

CURCUMIN-METAL COLOR COMPLEXES

TECHNICAL FIELD

It is known that the use of natural colorants in food products is frequently difficult. Many of the natural coloring compounds such as turmeric, annatto, paprika and the carotenoids are insoluble in water and sensitive to pH. Some of these natural colorants are made so as to be water dispersible by placing them on carriers such as polysorbates. Polysorbates are generally well known in foods as emulsifiers, solubilizers and dispersing agents. A good example of this is turmeric pigment. The water insoluble curcumin is combined with Polysorbate 80 ® which allows the previous insoluble turmeric to be dispersed.

Alleviating the solubility problem does not mean, however, that the natural coloring compound is now ready for use in foodstuffs. Color additives in food are used to emphasize the different type of food, identify the flavor and make the product generally more appealing. A natural colorant, such as turmeric, will be able to produce at best a limited number of yellow hues. Blending with other colorants, both natural and artificial, will be necessary to achieve product identity. This is not always useful since the amount of a natural colorant such as turmeric, which is a spice, needed to blend with other natural colorants or FD&C dyes may be so large as to alter the taste of the food product in which it was supposed to emphasize identity.

Presently, FD&C dyes, artificial colorants, are the principal materials used to color foods. They have a high degree of utility, are soluble in water regardless of pH, and are stable to light, air and temperature. In addition, such a small amount of the FD&C dye is required to color the foodstuff that the emphasis and identity functions are performed with no untoward effects. FD&C dyes are available in a wide range of colors, and blending of the colors to produce various shades is easily accomplished. However, many of the FD&C colors are presently being or have been criticized because of their artificial nature and because some have been found to be potential carcinogens. Therefore, production of a natural colorant which is both soluble and capable of producing a variety of hues would fill an urgent need.

FD&C Lakes are extensions of the FD&C water soluble dyes, which are physically absorbed on an alumina hydrate substratum. The FD&C Lakes are pigments and therefore not water soluble. Their coloring effect is accomplished through the dispersion of tiny color particles. The shade given by a FD&C Lake is not proportional to the pure dye. The temperature, the concentration of the reactants, the final pH of the reaction and even the nature of the agitation are important variables in determining the shade, particle size, dispersibility and even the tinctorial strength of the Lake. In addition, the tinctorial strength is not additive. For example, a product colored with one twenty-four percent Lake dye will not be as highly colored as the same product with two units of a twelve percent Lake. FD&C Lake compounds are also subject to the same attacks, artificial in nature and safety hazards, as their parent FD&C dyes.

Disclosure of the Invention

The present invention describes the combination of a colorant, curcumin ($C_{21}H_{20}O_6$), the color component of turmeric, with a metal. However, there are many key distinctions between a Lake pigment and the coloring complex formed as a result of this invention. To begin with, the FD&C Lake pigments start with a water soluble dye which is physically absorbed on an insoluble alumina hydrate substratum. The present invention starts with a curcumin-containing substrate which, with the exception of spray dried turmeric and turmeric oleoresin, is not water soluble. In the Lake compound the dye is physically absorbed onto the alumina hydrate substratum with a very high aluminum to dye concentration. The metal-curcumin color compound is formed by chemical interaction in the nature of a complex. The metal slightly alters the electron distribution of curcumin molecules thereby changing the manner in which light is diffracted. This results in varying hues depending upon the concentration of the metal which in any event is much lower than that of a Lake pigment. The curcumin-metal complex is affected by heat. Prolonged exposure or critical temperatures will destroy the complex, whereas a Lake pigment would not be so affected. Light, over a long period of time, would also have a destabilizing effect on the metal-curcumin complex. No such effect is noted on the Lake pigment. The curcumin-tin complex produces its color in the product by its ability to dissolve in water. The FD&C Lake is a pigment which is not water soluble and produces its coloring effect by dispersion.

The fact that a natural colorant can be made to produce varying hues of the same color by a complexing reaction with a metal, is new to the art. We have found that taking a curcumin-containing substrate, such as spray dried turmeric, turmeric oleoresin, single extract turmeric or multiple extract turmeric, as well as combinations thereof, and complexing it with a metal, will produce coloring compositions capable of producing varying hues. The coloring capabilities of the metal-curcumin complex will allow this natural colorant to be used to emphasize and identify a wider spectrum of product.

According to this invention, the natural colorant curcumin can be used to produce a broad spectrum of yellow colors suitable for use in a variety of foodstuffs. It will also be possible to produce a water soluble curcumin compound capable of producing varying hues which show an increased stability to light and heat.

BEST MODE FOR CARRYING OUT THE INVENTION

The varying colors of yellow hue resulting from the immediate invention are formulated by combining curcumin, the active colorant in turmeric, with certain metals capable of complexing with curcumin in the ratio of four to five moles of curcumin to each mole of metal. The variance in color hue depends upon the ratio of the color component to the metal. If the invention is to be used in a dry state, a non-toxic edible carrier is used. By co-drying the coloring complex and a non-toxic edible carrier, the invention is suitable for use in dry foodstuffs. When the source of curcumin to be used in the complex is not readily soluble in water, its solubility characteristics are increased by the use of an emulsifier.

A metal complex is a composition in which a central metal ion is bonded to other molecules by coordinate covalent bonds. Complexes are often easily reconvertible to the original simpler compounds. The metal ions used in the instant invention must possess the ability to attract the ion pair electrons on the oxygen atoms of the curcumin molecule to form a complex. In addition, the source of the metal ions, usually a salt, must be such that the anion remaining after dissociation does not prevent the formation of the metal-curcumin complex.

The stannous metal ion has been found to be particularly functional in producing a variety of hues through complexation with curcumin. Stannous chloride and stannous chloride dihydrate are particularly good sources of the stannous ion which readily allow formation of the complex. These compounds are white crystalline solids and are characterized as very powerful reducing agents. They are formed by dissolving tin in hydrochloric acid. The stannous ion produces the most notable shift in the hues obtainable by complexation with curcumin.

The zinc metal ion is also capable of complexing with the curcumin molecule to effect color hues, although not as notably as the stannous ion. The source of zinc ion may be an aqueous solution of zinc sulphate. Zinc sulphate exists as colorless crystals, without odor, astringent, with a metallic taste. It is usually formed by the action of sulfuric acid on zinc or zinc oxide.

Potassium and aluminum can also be used to complex with the curcumin molecule. However, the color hues produced are not as distinct as those resulting from complexation with tin or zinc. Both can be introduced to the curcumin as aqueous solutions of their salts.

Potassium sulphate is one of the salts used as the source of potassium ions. Potassium sulphate can be colorless or white crystals or powder which is odorless. It is principally synthesized by the Hargreaves process where potassium chloride is treated either with sulfuric acid or sulfur dioxide, air and water.

The source of aluminum can be either aluminum sulfate or aluminum hydroxide. Aluminum sulfate, frequently referred to as alum, exists as a white, lustrous solid. It occurs in nature as the mineral alunogenite. It is synthesized by treating pure kaolin or aluminum hydroxide or bauxite with sulfuric acid. Aluminum hydroxide is a white, gelatinous precipitate derived by treating a solution of aluminum sulfate or aluminum chloride with caustic soda, sodium carbonate or ammonia.

The aqueous solution of the metal ions can vary in concentration but is typically around one percent. In the alternative, the solid metal-containing compound is added to the aqueous solution of curcumin. The final curcumin to metal ratio in the coloring composition is approximately four to five moles of curcumin to each mole of metal ion.

Curcumin can be supplied by a number of sources. It is also known as turmeric yellow and diferuloylmethane. It is the principal colorant in the turmeric spice. Turmeric is the ground rhizome of the Curcuma longa L. It is separated from the rhizome either by a single extraction or by multiple extractions depending on the concentration desired. It is usually not water soluble. When a non-water soluble curcumin such as single extract turmeric, multiple extract turmeric or a synthetic turmeric is used as a source of curcumin to produce the instant invention, it is first treated with an emulsifier to effect solubilization.

Turmeric, when it is spray dried or turmeric oleoresin, can also be water soluble. The spray dried turmeric is turmeric co-dried with a carrier which allows solubility. Turmeric oleoresin is the compound obtained from turmeric by extraction using any one of a number of solvents.

In the instant invention, if water soluble turmeric is used, an aqueous solution is prepared. This solution can vary in concentration but is typically around one percent. If the turmeric used as a source of curcumin is not water soluble, it is first dissolved in an emulsifier. This mixture of curcumin and emulsifier can vary in curcumin concentration from one percent to thirty percent. Typically, the mixture will be approximately ten percent curcumin to ninety percent emulsifier.

To solubilize the otherwise insoluble curcumin, emulsifiers are used. The insoluble curcumin is ground before it is mixed with an emulsifier. Grinding can be by ball mill, jet mill or any other high shear grinding unit common in the food industry. The emulsifiers frequently used are the polysorbates. Polysorbates, in the instant invention Polysorbate 60 ®️ or Polysorbate 80 ®️, are generally known for their use in foods as solubilizing and dispersing agents. Polysorbates are nonionic surfactants obtained by the esterification of sorbitol with one or three molecules of a fatty acid ester (stearic, lauric, oleic, palmitic) under conditions which cause splitting out of water from the sorbitol, leaving sorbitan. Specifically, they are used as emulsifiers in ice cream, frozen custard, ice milk, icings, fillings and toppings. They are used as solubilizing and dispersing agents in pickles, pickle products, fat soluble vitamin and vitamin/mineral preparations and as dispersing agents in gelatin desserts and gelatin dessert mixes.

Other emulsifying agents such as propylene glycol and vegetable oil will also effect solubilization. Propylene glycol is a colorless, viscous, stable, hygroscopic liquid which is practically odorless and tasteless. It is prepared industrially from propylene which is converted to the chlorohydrin by chlorine water, and the chlorohydrin is converted to the glycol by sodium carbonate. Vegetable oils are usually extracted from the seeds, fruit or leaves of plants and generally considered to be mixtures of mixed glycerides.

The mixture ratio of curcumin to emulsifier is from one to thirty percent curcumin to seventy to ninty-nine percent emulsifier, the optimum ratio being ten percent curcumin to ninety percent emulsifier.

If the instant invention is to be used in a non-aqueous food system, it is necessary to co-dry the coloring complex with a non-toxic edible carrier. Edible food carriers which are suitable for co-drying with the color complex are: dextrins such as Mor-Rex ®️ 1918, modified starches such as Capsul ®️ and gums such as Keltrol ®️ or CMC ®️. Drying with the color complex is done by drum drying, spray drying, freeze drying or other methods commonly used in the food industry.

The non-toxic edible carrier is introduced by means of an aqueous solution. The concentration of edible carrier in solution ranges from twenty to sixty percent. The optimum concentration of edible carrier in solution is about fifty percent.

The coloring complex produced by this invention can be used either alone or in combination with any other natural or artificial coloring compound. The amounts needed to identify and emphasize a particular product and its flavor will be readily apparent to those skilled in the art. The present invention can be used in such foodstuffs as beverages, gelatin desserts, main meals, puddings, sauces and toppings.

The following examples are intended to be illustrative of the present invention but are not to be construed as limiting in any sense.

EXAMPLE I

A liquid coloring compound of intense orange color, having a curcumin to tin molar ratio of 4.6 to 1, was prepared by dissolving 1 gram of water soluble, spray dried turmeric in 50 ml of water. To this solution was added 2 ml of a one percent aqueous stannous chloride solution. The resulting mixture is stirred and the complex is formed as evidenced by an immediate hue change. Further mixing will alter the hue.

It should be emphasized that we have found the complex formed is stable to weak chelating agents such as citric and ascorbic acid, such weak-chelating agents, have no effect on the complex.

EXAMPLE II

A dry powder capable of coloring foodstuffs with varying yellow hues, having a curcumin to tin molar ratio of 4.6 to 1, was prepared by first grinding the water insoluble turmeric with a mortar and pestle. The ground curcumin-containing substrate is then dissolved in Polysorbate 80 ® at 60° to 70° C. The mixture is then allowed to cool to room temperature. A one percent solution of stannous chloride dihydrate is then added to the mixture containing the ground turmeric and the Polysorbate 80 ®. After the addition of the stannous chloride, the reaction mixture is covered and allowed to stir. The complexation reaction produces a hue change in approximately fifteen minutes. However, the reaction mixture can be stirred for whatever period is necessary to produce the desired hue, the hue becoming increasingly more intense as it is permitted to stir. Stirring can continue for twenty-four to forty-eight hours and beyond. While the reaction mixture is stirring, Capsul ® is being dissolved in water at about 60° to 70° C. The capsul solution is then allowed to cool to room temperature. The reaction mixture containing the tin-curcumin coloring complex is then mixed with the aqueous solution of Capsul ® and spray dried. The dried product is composed of equal parts of the tin-curcumin coloring complex and the Capsul ®.

It will be appreciated that the examples, conditions, and the like are intended for illustrative purposes, and that obvious variations and modifications may be made without varying from the scope of the invention. Having set forth the general nature and specific embodiments of the present invention, the true scope is now particularly pointed out in the appended claims.

What is claimed is:

1. A water-soluble curcumin-metal complex comprising a metal ion component selected from the group consisting of stannous ion, zinc ion and mixtures thereof and a curcumin-component yielding an improved color composition having a curcumin to metal molar ratio of four to five moles of curcumin to each mole of metal ion and having longer lasting stability and the ability to provide many different hues in relation to the metal concentration.

2. The curcumin-metal complex as recited in claim 1 wherein the metal ion component is
   stannous ion.

3. The curcumin-metal complex as recited in claim 1 wherein the curcumin-component is derived from a member of the group consisting of:
   (a) single extract turmeric;
   (b) multiple extract turmeric;
   (c) spray-dried turmeric;
   (d) turmeric oleoresin;
   (e) synthesized curcumin; and
   (f) mixtures thereof.

4. The curcumin-metal complex as recited in claim 1 which is co-dried with a non-toxic, edible carrier material selected from the group consisting of:
   (a) malto-dextrins;
   (b) modified starches;
   (c) gums; and
   (d) mixtures thereof.

5. The co-dried curcumin-metal complex and carrier as recited in claim 4 which contains an emulsifier selected from the group consisting of:
   (a) polysorbates;
   (b) propylene glycol;
   (c) vegetable oil; and
   (d) mixtures thereof,
said emulsifier being used to solubilize the otherwise water-insoluble curcumin.

6. A process for producing a stable, water-soluble curcumin-metal complex capable of producing various hues of the same color comprising:
   (a) dissolving a water soluble curcumin-containing substrate in water;
   (b) adding metal selected from the group consisting of stannous ion, zinc ion and mixtures thereof to form a curcumin-metal complex having a curcumin to metal molar ratio of four to five moles of curcumin to each mole of metal ion; and
   (c) mixing until a hue change is observed.

7. The process according to claim 6 wherein the water soluble curcumin-containing substrate is spray dried turmeric or turmeric oleoresin.

8. A process for producing a stable, water soluble curcumin-metal complex capable of producing various hues of the same color, comprising:
   (a) grinding a water insoluble curcumin-containing substrate;
   (b) dissolving the ground curcumin-containing substrate into an aqueous solution containing an emulsifier;
   (c) adding to the solution of step (b) a metal ion selected from the group consisting of stannous ion, zinc ion and mixtures thereof, said solution having a curcumin to metal molar ratio of four to five moles of curcumin to each mole of metal ion;
   (d) stirring the mixture of step (c) for at least fifteen minutes and until a desired hue is obtained;
   (e) mixing the complex formed in step (d) with an aqueous solution of a nontoxic edible carrier; and
   (f) drying the resulting compound.

9. The process according to claim 8 wherein the insoluble curcumin-containing substrate is selected from the group consisting of:
   (a) single extract turmeric;
   (b) multiple extract turmeric;
   (c) synthesized curcumin; and
   (d) mixtures thereof.

10. The process according to claim 7 or claim 9 wherein the metal is
    a stannous ion.

11. The process according to claim 8 wherein the emulsifier is selected from the group consisting of:
    (a) polysorbates
    (b) propylene glycol;
    (c) vegetable oil; and (d) mixtures thereof.

12. The process according to claim 8 wherein the non-toxic edible carrier is selected from the group consisting of:

(a) malto-dextrins;
(b) modified starches;
(c) gums; and
(d) mixtures thereof.

* * * * *